US009887781B1

(12) United States Patent
Chuang (10) Patent No.: US 9,887,781 B1
(45) Date of Patent: Feb. 6, 2018

(54) HIGH RESOLUTION INTERPOLATOR FOR OPTICAL ENCODER (71) Applicant: TT Electronics Plc, Carrollton, TX (US)

(72) Inventor: Hsueh hua Chuang, Plano, TX (US)

(73) Assignee: TT ELECTRONICS PLC, Carrollton, TX (US)

(*) Notice: Subject to any disclaimer, the term of this patent is extended or adjusted under 35 U.S.C. 154(b) by 0 days.

(21) Appl. No.: 15/332,615

(22) Filed: Oct. 24, 2016

(51) Int. Cl.
G01D 5/34 (2006.01)
G02F 1/035 (2006.01)
G01B 11/14 (2006.01)
H04B 10/54 (2013.01)
H04B 10/61 (2013.01)

(52) U.S. Cl.
CPC .......... H04B 10/54 (2013.01); H04B 10/616 (2013.01)

(58) Field of Classification Search
CPC ............................... H04B 10/54; H04B 10/616
USPC ................................................ 398/115, 116
See application file for complete search history.

(56) References Cited

U.S. PATENT DOCUMENTS

| 4,079,251 | A | 3/1978 | Osann, Jr. | |
|---|---|---|---|---|
| 4,288,785 | A | 9/1981 | Papuchon et al. | |
| 5,844,814 | A * | 12/1998 | Chliwnyj | G01D 5/34715 324/207.13 |
| 6,355,927 | B1 * | 3/2002 | Snyder | G01D 5/24404 250/214 R |
| 6,816,091 | B1 | 11/2004 | Chee | |
| 7,019,282 | B2 | 2/2006 | Atsuta et al. | |
| 7,164,120 | B2 * | 1/2007 | Strasser | G01D 5/2457 250/231.13 |
| 7,554,079 | B2 * | 6/2009 | Rai | G01D 5/24461 250/231.13 |
| 8,772,705 | B2 | 7/2014 | Rai | |
| 2002/0159668 | A1 * | 10/2002 | Williams | G02F 1/065 385/2 |
| 2005/0238365 | A1 * | 10/2005 | Tan | G01D 5/24404 398/183 |
| 2007/0126607 | A1 * | 6/2007 | Foo | G01D 5/34792 341/50 |

(Continued)

OTHER PUBLICATIONS

Emura ["A High-Resolution Interpolator for Incremental Encodersby Tow-Phase Type PLL Method", IEEE 1993].*

(Continued)

Primary Examiner — Oommen Jacob
(74) Attorney, Agent, or Firm — Haynes and Boone, LLP (57) ABSTRACT A device includes an optical modulator configured to produce first and second modulated optical signals in response to a first electrical signal and a reference optical signal. The device further includes a phase detector configured to receive first and second encoded optical signals and the first and second modulated optical signals and to produce a second electrical signal indicating a phase difference between the first encoded optical signals and the first modulated optical signals. The device further includes a voltage-controlled oscillator configured to produce electrical pulses in response to the second electrical signal, and a counter configured to count a number of the electrical pulses, producing a count. The first electrical signal to the optical modulator is the count or a derivative of the count.

20 Claims, 9 Drawing Sheets (56) References Cited

U.S. PATENT DOCUMENTS

| | | | | |
|---|---|---|---|---|
| 2012/0138781 A1* | 6/2012 | Rai | ................ | G01D 5/36 |
| | | | | 250/231.13 |
| 2014/0270807 A1* | 9/2014 | Hutchinson | .......... | H04B 10/532 |
| | | | | 398/184 |
| 2015/0215043 A1* | 7/2015 | Debregeas | ............ | H01S 5/0625 |
| | | | | 398/79 |
| 2016/0102996 A1* | 4/2016 | Benammar | ............. | H03L 7/093 |
| | | | | 702/151 |

OTHER PUBLICATIONS

Wang ["High-Precicion Interpolation Using Twp-Phase Type PLL for Encoders That Have Distorted Waveform", IEEE 1997, International Conference on Intelligent Processing systems].*

Herzog ["An optical phase locked loop for coherent space communications" ETH Zurich Research Collection 1997].*

Emura et al., "A High-Resolution Interpoklator for Incremental Encoders Based on the Quadrature PLL Method," IEEE Transactions on Industrial Electronics, vol. 47, No. 1, Feb. 2000, 7 pgs.

Chiang et al., "Design of a CMOS Phase to Digital Transducer for Optical Incremental Sensors", Sensors and Actuators A: Physical journal homepage: www.elsevier.com/locate/sna, May 31, 2011, 7 pgs.

* cited by examiner

HIGH RESOLUTION INTERPOLATOR FOR OPTICAL ENCODER

BACKGROUND

Optical encoders are used in position displacement measurement related to linear or angular movement. A typical optical encoder employs a light source that projects a light beam towards a code wheel or a code strip. Movement of the code wheel or code strip "encodes" the light beam, which is subsequently received by light detectors. The light detectors convert the encoded light into electrical signals or codes, which are processed by electrical circuits for the position displacement measurement. In an absolute encoder, each output from the encoder corresponds to a unique position of the code wheel or code strip. In an incremental encoder, the output of the encoder is a count or a train of pulses.

Interpolators are an important component in optical encoders, as they improve the accuracy and resolution of the optical encoders. The resolution and frequency response of the interpolator directly affect the resolution of the optical encoder. Some traditional interpolators based on TTL (transistor-transistor logic) comparators or ADCs (analog-digital convertors) do not provide enough resolution for high-speed systems. For example, they may have a maximum interpolation factor of about 50. Interpolators based on quadrature electrical phase-locked loop (QEPLL) may provide an interpolation factor of about 70. However, QEPLL-based interpolators generally require a ROM (read-only memory) and a look-up table to produce reference waveforms, which requires large chip or board area and is therefore not cost-effective. Improvements in these areas are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

The present disclosure is generally related to optical encoders and optical encoding methods. More particularly, the present disclosure is related to a new and improved interpolator for incremental optical encoders. Various embodiments employ an optical modulator in a phase-locked loop (PLL) in addition to electrical components. Therefore, the PLL is quasi-optical (or quasi-electrical). This novel PLL provides high frequency response and noise rejection, and improves the interpolation factor of the interpolator. Further, this novel PLL design may in some applications use less chip or board area than the ROMs and look-up tables in existing electrical interpolators. Therefore, some embodiments may be manufactured more economically than its counterparts.

Figure 1:
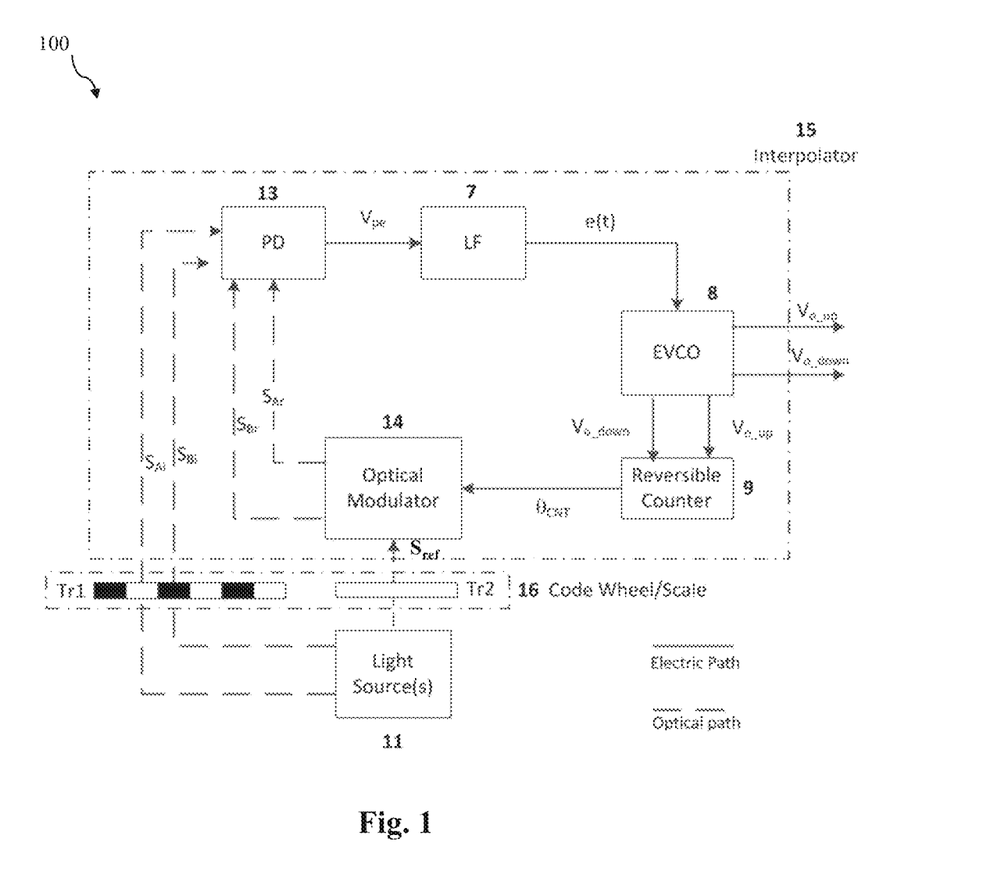
FIG. 1 is a simplified block diagram of an optical encoder in an embodiment, according to aspects of the present disclosure.

Referring to FIG. 1, shown therein is a schematic view of certain components in an optical encoder (or optical encoding system) 100, constructed according to aspects of the present disclosure. In a brief overview, the present embodiment of the optical encoder 100 includes a light source 11, a coding apparatus 16 which may be a code wheel or code strip, and an interpolator 15. The interpolator 15 includes a quasi-optical PLL (QOPLL) having an optical modulator 14, a phase detector (PD) 13, a loop filter (LF) 7, an electrical voltage-controlled oscillator (EVCO) 8, and a reversible counter 9, connected in a closed loop. The optical encoder 100 may include other components not shown in FIG. 1, such as power circuitry, interface circuitry, and other suitable components known in the art.

In operation, the light source 11 projects one or more light beams towards the coding apparatus 16 which in turn outputs optical signals $S_{Ai}$, $S_{Bi}$, and $S_{ref}$. The optical signals $S_{Ai}$ and $S_{Bi}$ are encoded by the coding apparatus 16, while the optical signal $S_{ref}$ remains un-encoded. Further, the optical signals $S_{Ai}$ and $S_{Bi}$ are out of phase by 90 degrees in the present embodiment. The interpolator 15 receives and processes the optical signals $S_{Ai}$, $S_{Bi}$, and $S_{ref}$. More particularly, the optical modulator 14 modulates the optical signal $S_{ref}$ with an electrical input signal $\theta_{CNT}$ and produces two modulated optical signals $S_{Ar}$ and $S_{Br}$. In the present embodiment, the optical signals $S_{Ar}$ and $S_{Br}$ are also out of phase by 90 degrees. The phase detector 13, having photo detectors, detects the phase difference between the optical signals $S_{Ai}$ and $S_{Br}$ (or between $S_{Bi}$ and $S_{Ar}$. The loop in the interpolator 15 is designed to minimize this phase difference. In other words, when the QOPLL reaches a stable operation state, the phase in the optical signals $S_{Ar}$ and $S_{Br}$ tracks (or locks onto) the phase of the optical signals $S_{Ai}$ and $S_{Bi}$. Accordingly, the outputs from the EVCO 8, $V_{o\_up}$ and $V_{o\_down}$, become the interpolated electrical signals of the optical signals $S_{Ai}$ and $S_{Bi}$. Compared with existing QEPLL-based interpolators, the interpolator 15 may be built to be more compact, yet provide higher frequency response. Detailed structures and operations of each of the above components are further discussed below.

In an embodiment, the light source 11 includes a light emitting diode (LED). In another embodiment, the light source 11 includes a semiconductor laser which produces a coherent light. The wavelength or spectrum of the light produced by the light source 11 works compatibly with the coding apparatus 16, the optical modulator 14, and various photo detectors in the PD 13. The light source 11 may further include one or more collimating optics (e.g., in a transmissive optical encoder) or one or more focusing optics (e.g., in a reflective optical encoder).

Figure 2:
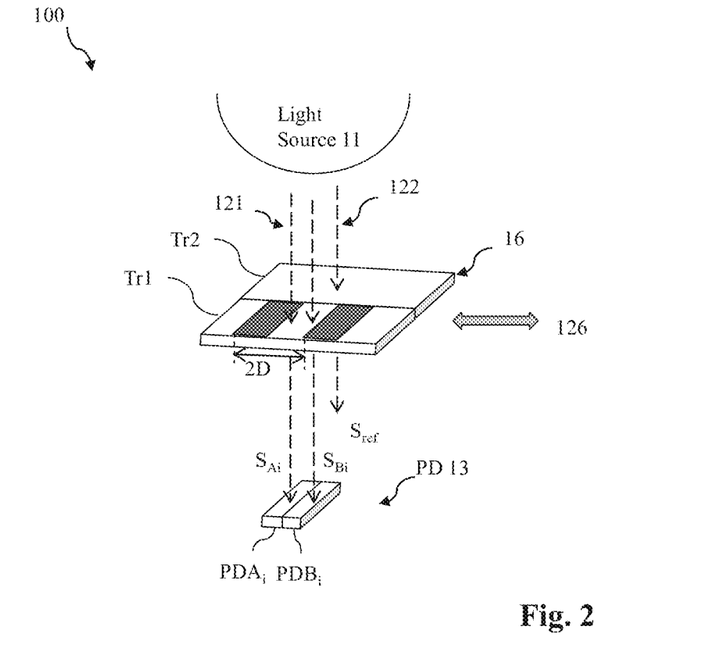
FIG. 2 illustrates a partial view of the optical encoder of FIG. 1 including a transmissive coding apparatus, in accordance with an embodiment.
Figure 3:
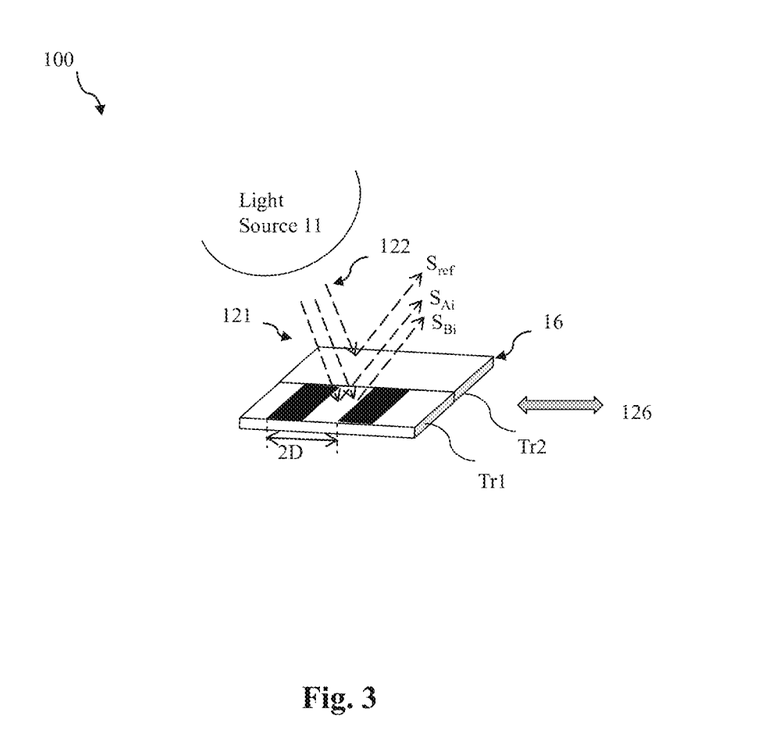
FIG. 3 illustrates a partial view of the optical encoder of FIG. 1 including a reflective coding apparatus, in accordance with an embodiment.

The coding apparatus 16 may move angularly (e.g., rotary motion by a code wheel) or linearly (e.g., linear motion by a code strip) between the light source and the interpolator 15. Further, the coding apparatus 16 may be transmissive or reflective with respect to the light produced by the light source 11. An example of the optical encoder 100 with a transmissive coding apparatus 16 is illustrated in FIG. 2, constructed according to aspects of the present disclosure. Another example of the optical encoder 100 with a reflective coding apparatus 16 is illustrated in FIG. 3, constructed according to aspects of the present disclosure.

Referring to FIG. 2, illustrated therein is a perspective view of some components in the optical encoder 100 with a transmissive coding apparatus 16, in accordance with an embodiment. The coding apparatus 16 (e.g., a code wheel or a code strip) includes at least two tracks, Tr1 and Tr2. The track Tr1 has alternative light transmissive and opaque regions (or stripes), indicated by the white and dark spaces, respectively. Each of the light transmissive and opaque regions has a width "D" along the direction of motion 126. The light transmissive and opaque regions form a periodic pattern with a period of "2D."

Further illustrated in FIG. 2 is a partial view of the phase detector (PD) 13. The PD 13 includes two photo detectors, $PDA_i$ and $PDB_i$. Here, "A" and "B" denote channel A and channel B in this single-track two-channel optical encoder, while "i" denotes encoded signal "inputs" to the interpolator 15 (FIG. 1). The photo detectors, $PDA_i$ and $PDB_i$, are arranged side-by-side and each have a width of half D (D/2). In an embodiment, each of the $PDA_i$ and $PDB_i$ includes an array of photodiodes.

A light beam 121 is produced by the light source 11, collimated (e.g. by a lens), and directed at the track Tr1. When the coding apparatus 16 moves, the light beam that reaches the photo detectors $PDA_i$ and $PDB_i$ are interrupted (or "encoded"). In FIG. 2, the light beam that reaches the photo detector $PDA_i$ is denoted as $S_{Ai}$, while the light beam that reaches the photo detector $PDB_i$ is denoted as $S_{Bi}$. As the coding apparatus 16 moves, the intensity of the light beams $S_{Ai}$ and $S_{Bi}$ varies depending on how much area of the photo detectors $PDA_i$ and $PDB_i$, respectively, is covered by the opaque stripes. Based on the configuration of Tr1 and the photo detectors $PDA_i$ and $PDB_i$ as discussed above, the optical signals $S_{Ai}$ and $S_{Bi}$ are designed to be out of phase by 90 degrees.

Still referring to FIG. 2, the track Tr2 does not have the opaque regions. In other words, the track Tr2 is always transmissive for the entire length of encoding. The light beam 122 is produced by the light source 11 and directed at the track Tr2. The light beams 121 and 122 may be different beamlets of the same collimated light beam. The light beam 122 passes through the track Tr2 and becomes the optical signal $S_{ref}$.

Referring to FIG. 3, illustrated therein is a perspective view of some components in the optical encoder 100 with a reflective coding apparatus 16, in accordance with an embodiment. The coding apparatus 16 (e.g., a code wheel or a code strip) includes two tracks, Tr1 and Tr2. The track Tr1 has alternative light reflective and absorptive regions (or stripes), indicated by the white and dark spaces, respectively. The track Tr2 does not have the light absorptive regions. In other words, the track Tr2 is always reflective for the entire length of encoding. Other aspects of the reflective coding apparatus 16 are the same as those discussed with the transmissive coding apparatus 16 in FIG. 2. The collimated light beams 121 and 122 may be focused by appropriate optics of the light source 11. For the purpose of simplicity, the photo detectors $PDA_i$ and $PDB_i$ are not shown in FIG. 3. When the coding apparatus 16 moves along the direction 126, the optical signals $S_{Ai}$ and $S_{Bi}$ may be interrupted or dimmed periodically, thereby optically "encoding" the movement of the coding apparatus 16. In the present embodiment, the track Tr1 and the photo detectors $PDA_i$ and $PDB_i$ are configured such that the optical signals $S_{Ai}$ and $S_{Bi}$ are out of phase by 90 degrees.

Figure 4:
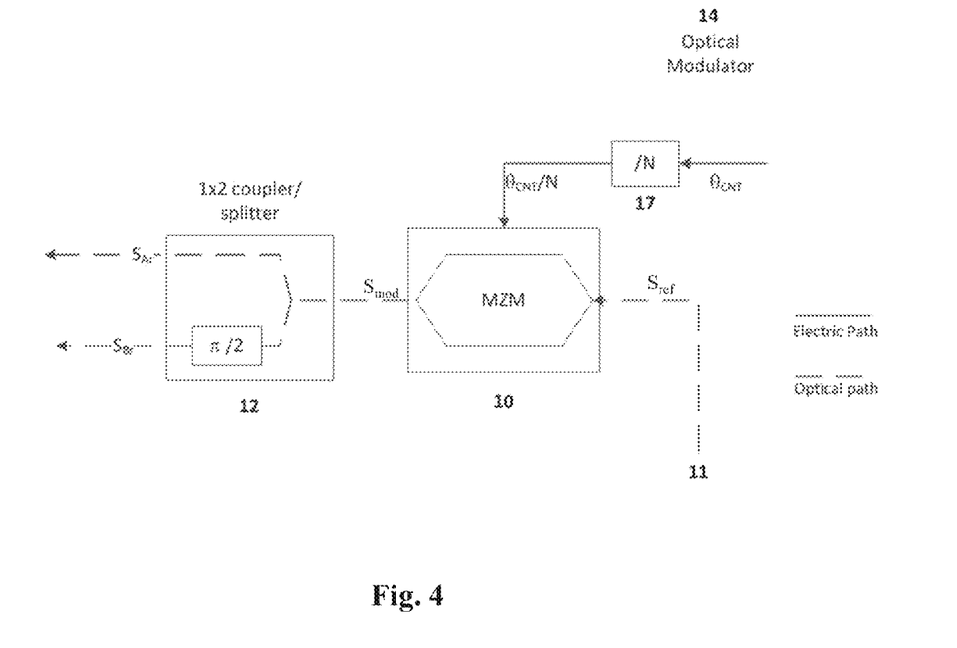
FIG. 4 is a simplified block diagram of an optical modulator in the optical encoder of FIG. 1, in accordance with an embodiment.

Referring to FIG. 4, shown therein is an embodiment of the optical modulator 14, constructed according to aspects of the present disclosure. The optical modulator 14 includes a voltage-controlled optical modulator 10, a divider 17, and an optical coupler or optical splitter 12. The optical modulator 14 receives the reference optical signal $S_{ref}$, and produces two modulated optical signals $S_{Ar}$ and $S_{Br}$ in response to the optical signal $S_{ref}$ and the input electrical signal $\theta_{CNT}$. Here, "A" and "B" denote channel A and channel B, respectively, and "r" denotes "reference" signal input to the interpolator 15 (FIG. 1). In the embodiment shown, the input signal $\theta_{CNT}$ is divided (in the divider 17) by a positive integer "N" before being used for modulating the optical signal $S_{ref}$. The integer N is the interpolation factor of the interpolator 15, and can be designed according to desired resolution and accuracy. The divider 17 can be implemented with logic gates, flip flops, and/or other circuit elements. In the present embodiment, the voltage-controlled optical modulator 10 is a digitally-controlled light intensity modulator. In a further embodiment, the modulator 10 is a type of March-Zehnder optical modulator (MZM). Therefore, it may also be called MZM 10 in the following discussion. However, it is noted that, the implementation of the modulator 10 is not limited to March-Zehnder type of modulators.

According to the present embodiment, the modulator 10 uses digital inputs ($\theta_{CNT}$) to modulate the optical signal $S_{ref}$, thereby producing a modulated reference optical signal $S_{mod}$. For example, it first converts an n-bit binary input to analog signals by assigning the n-bit binary signal to n bias voltages, with each bit corresponding to one bias voltage. It then applies the bias voltages on electrodes, which in turn cause phase shift in the optical signal $S_{ref}$ as the optical signal $S_{ref}$ passes through the modulator 10. The accumulated phase shift $\Delta \varphi$ at the output $S_{mod}$ of the modulator 10 is proportional to the summation of the input bias voltage over time. In other words, $\Delta \varphi \propto \int v(t) dt$, where $v(t)$ is the bias voltage. In an embodiment, the modulator 10 converts the phase shift $\Delta \varphi$ to intensity variation in the optical signal output $S_{mod}$.

Figure 5:
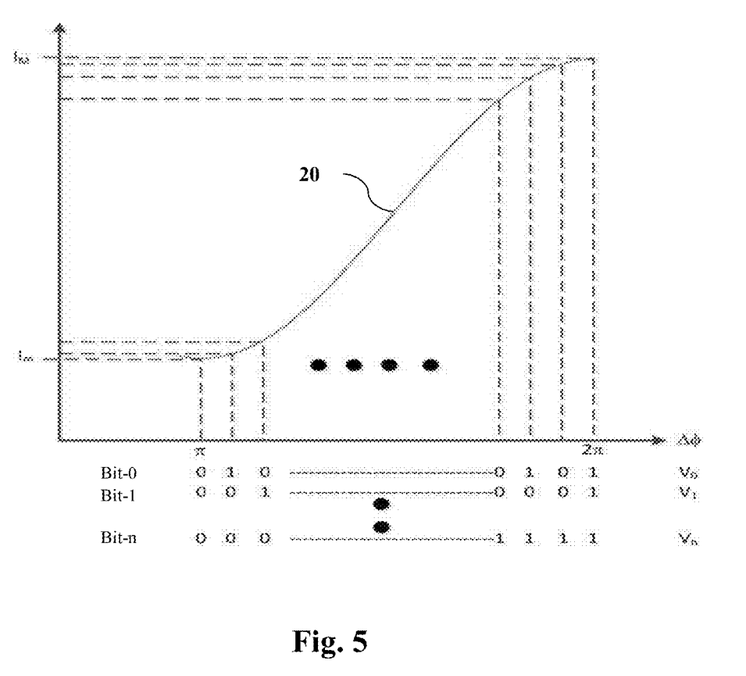
FIG. 5 illustrates an optical output from the optical modulator of FIG. 4, in accordance with an embodiment.

FIG. 5 illustrates a curve 20 of intensity variation as a function of phase shift $\Delta \varphi$. The intensity of the optical signal $S_{mod}$ varies between the minimum intensity $I_m$ and the maximum intensity $I_M$. In the present embodiment, the intensity varies as a sinusoidal function of the phase shift $\Delta\varphi$ according to one embodiment. Labeled underneath the phase axis are the values of the n-bit binary input $\theta_{CNT}/N$. For example, when the n bits are all 0's, the phase shift $\Delta\varphi$ is $\pi$; when the n bits are all 1's, the phase shift $\Delta\varphi$ is $2\pi$; and so on. The labels $V_0, V_1, \ldots V_n$ denote the bias voltages applied by the modulator 10, which correspond to the bits bit-0, bit-1, . . . bit-n, respectively.

Some implementations of the modulator 10 may be found in the U.S. Pat. No. 4,288,785, which is incorporated by reference herein. For example, the modulator 10 may be designed similar to the optical modulator shown in FIGS. 3 and 5-8 of the '785 patent.

Figure 6:
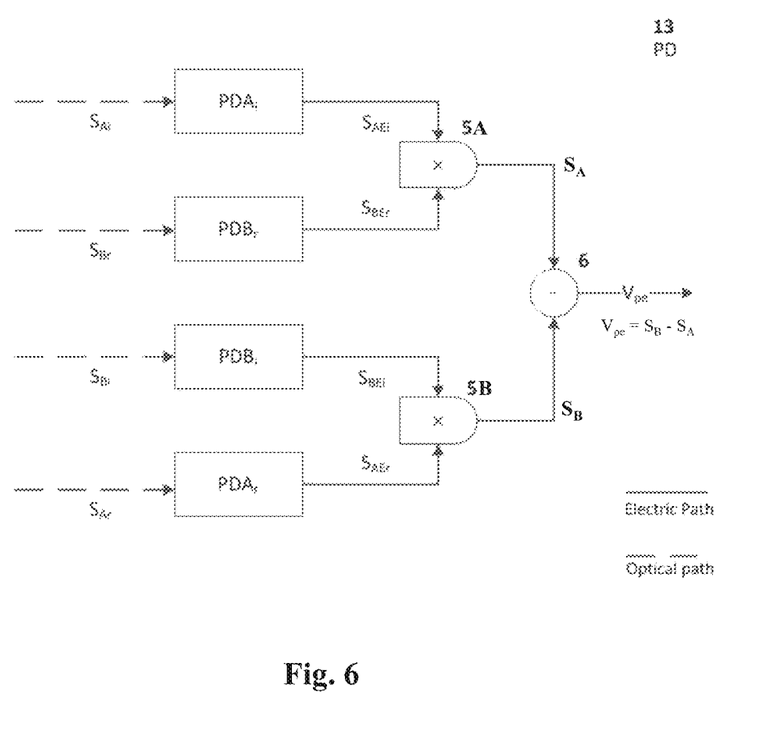
FIG. 6 is a simplified block diagram of a phase detector in the optical encoder of FIG. 1, in accordance with an embodiment.

Referring again to FIG. 4, the modulated optical signal $S_{mod}$ is fed to the optical coupler/splitter 12 which splits $S_{mod}$ into two optical signals $S_{Ar}$ and $S_{Br}$. The optical path for the signal $S_{Br}$ further includes an optical delay of $\pi/2$. Therefore, the optical signals $S_{Ar}$ and $S_{Br}$ are out of phase by 90 degrees. In an embodiment, the optical coupler/splitter 12 is a 3 dB directional coupler Referring to FIG. 6, shown therein is a schematic block diagram of the PD 13, constructed according to aspects of the present disclosure. The PD 13 includes four photo detectors, $PDA_i$, $PDB_i$, $PDA_r$, and $PDB_r$. Each of the photo detectors can include a photo diode, a photo transistor, a photo gate, a photovoltaic cell, or other types of photo-electric converter. Each of the photo detectors is capable of detecting an optical signal and converting the optical signal into an electrical signal. The photo detectors $PDA_i$ and $PDB_i$ are used for receiving the encoded optical signals $S_{Ai}$ and $S_{Bi}$, respectively, and converting them into encoded electrical signals $S_{AEi}$ and $S_{BEi}$, respectively. The photo detectors $PDA_r$ and $PDB_r$ are used for receiving the modulated reference optical signals $S_{Ar}$ and $S_{Br}$, respectively, and converting them into modulated reference electrical signals $S_{AEr}$ and $S_{BEr}$, respectively.

Certain aspects of the photo detectors $PDA_i$ and $PDB_i$ have been discussed with reference to FIG. 2. In an embodiment, the photo detectors $PDA_i$ and $PDB_i$ are photo diodes with grating structures thereon to increase the quantum efficiency of the respective photo detector. One consideration for such design is that the resolution of the optical encoder 100 depends on the sensitivity of the photo detectors $PDA_i$ and $PDB_i$ as they are part of the mechanism for creating the phase difference in the encoded electrical signals $S_{AEi}$ and $S_{BEi}$. Further, light intensity in the encoded optical signals $S_{Ai}$ and $S_{Bi}$ may not be ideal as the light beam passes through various optics and the coding apparatus 16 before reaching the photo detectors $PDA_i$ and $PDB_i$ (see FIG. 2 for example). Hence, it may be desirable for the photo detectors $PDA_i$ and $PDB_i$ to have a grating structure (not shown) to enhance light reception thereon. Alternatively, the photo detectors $PDA_i$ and $PDB_i$ may employ other types of optical enhancement structures, such as cones, pillars, pyramids, quantum dots, and the like.

In contrast, the photo detectors $PDA_r$ and $PDB_r$ can be designed with relatively more freedom than the photo detectors $PDA_i$ and $PDB_i$. For example, the photo detectors $PDA_r$ and $PDB_r$ do not have to be arranged side-by-side as the phase difference has been embedded in the optical signals $S_{Ar}$ and $S_{Br}$ by the optical modulator 14. Also, the photo detectors $PDA_r$ and $PDB_r$ may be placed in close proximity to the optical modulator 14. Therefore, they may not need gratings or other types of optical enhancement structures in order to properly receive the optical signals $S_{Ar}$ and $S_{Br}$. In an embodiment, the photo detectors $PDA_r$ and $PDB_r$ and the optical modulator 14 are manufactured on the same chip to further increase the degree of integration.

Still referring to FIG. 6, the PD 13 further includes two multipliers 5A and 5B and a subtractor 6. The two multipliers 5A and 5B may be implemented with logic gates, operational amplifiers, transistors, and/or other circuit elements. The subtractor 6 may be implemented using logic gates, transistors, operational amplifiers, adders, and/or other circuit elements. In the present embodiment, the multiplier 5A multiplies the channel A encoded electrical signal $S_{AEi}$ and the channel B modulated reference signal $S_{BEr}$ and produces a multiplied electrical signal $S_A$. Similarly, the multiplier 5B multiplies the channel B encoded electrical signal $S_{BEi}$ and the channel A modulated reference signal $S_{AEr}$ and produces a multiplied electrical signal $S_B$. The subtractor 6 subtracts the signal $S_A$ from the signal $S_B$, and produces an output electrical signal $V_{pe}$. The signal Vpe can be expressed in terms of the phase information in the encoded signals ($S_{AEi}$ and $S_{BEi}$) and the modulated reference signals ($S_{AEr}$ and $S_{BEr}$), as discussed below.

In the present embodiment, the various modules are designed such that the signals $S_{AEi}$, $S_{BEi}$, $S_{AEr}$, and $S_{BEr}$ are sinusoidal signals. Further, the signals $S_{AEi}$ and $S_{BEi}$ are out of phase by 90 degrees and the signals $S_{AEr}$ and $S_{BEr}$ are out of phase by 90 degrees. Therefore, they can be expressed as follows:

$$S_{AEi} = a*\cos\theta_i \quad (1)$$

$$S_{BEi} = a*\sin\theta_i \quad (2)$$

$$S_{AEr} = b*\cos\theta_o \quad (3)$$

$$S_{BEr} = b*\sin\theta_o \quad (4)$$

In the above equations (1)-(4), the phase $\theta_i$ is the phase carried by the encoded electrical signals $S_{AEi}$ and $S_{BEi}$, and the phase $\theta_o$ is the phase carried by the modulated electrical signals $S_{AEr}$ and $S_{BEr}$. The multiplied signals $S_A$ and $S_B$ can be expressed as follows:

$$S_A = S_{AEi}*S_{BEr} = ab*\cos\theta_i \sin\theta_o = (ab/2)*(\sin(\theta_i+\theta_o) - \sin(\theta_i-\theta_o)) \quad (5)$$

$$S_B = S_{AEr}*S_{BEi} = ab*\cos\theta_o \sin\theta_i = (ab/2)*(\sin(\theta_i+\theta_o) + \sin(\theta_i-\theta_o)) \quad (6)$$

$$V_{pe} = S_B - S_A = ab*\sin(\theta_i-\theta_o) = ab*\sin\varphi_E \quad (7)$$

As can be seen in equation (7), the output $V_{pe}$ carries the information of the phase error (or phase difference) $\varphi_E$ between the encoded signals $S_{AEi}$ and $S_{BEi}$ and the modulated reference signals $S_{AEr}$ and $S_{BEr}$.

Referring back to FIG. 1, the signal $V_{pe}$ is fed to the loop filter (LF) 7. In the present embodiment, the loop filter 7 is a low-pass filter with a low cutoff frequency for filtering out high frequency components in the signal $V_{pe}$. Since Vpe carries only the phase error between the encoded signal and the modulated reference signal, the parameters of the loop filter 7 can be determined independent of the frequency of either the encoded signals $S_{AEi}$ and $S_{BEi}$ or the modulated reference signals $S_{AEr}$ and $S_{BEr}$. The loop filter 7 can be implemented using logic gates, operational amplifiers, resistors, capacitors, and/or other circuit elements. When the phase error $\varphi_E$ is sufficiently small, the output signal e(t) from the loop filter 7 can be expressed as follows:

$$e(t) = ab*\varphi_E \quad (8)$$

The signal e(t) is fed to the EVCO 8. In response to the signal e(t), the EVCO 8 produces electrical pulses which may be square wave pulses or sinusoidal pulses. The outputs of the EVCO 8 are the interpolated signal outputs of the optical encoder 100. The EVCO 8 can be implemented with resistors, capacitors, varactors, diodes, operational amplifier, transistors, and/or other circuit elements as known in the art. In the present embodiment, the EVCO 8 is a voltage-frequency converter and the signal e(t) is applied to an input voltage of the EVCO 8. In response to the signal e(t), the EVCO 8 produces two trains of pulses $V_{o\_up}$ and $V_{o\_down}$, signifying incrementing and decrementing respectively. For example, a pulse on $V_{o\_up}$ may indicate incrementing by 1 in the clockwise direction while a pulse on $V_{o\_down}$ may indicate incrementing by 1 in the counter-clockwise direction (which is same as decrementing by 1 in the clockwise direction). In another embodiment, the EVCO 8 produces two trains of pulses $V_o$ and $V_{dir}$ (not labeled in FIG. 1), signifying incrementing and direction respectively. For example, a pulse on $V_o$ may increment the clockwise count or the counter-clockwise count, depending on the value of the $V_{dir}$. The train of pulses from the EVCO 8 is sent to external circuit (not shown) for further processing.

The train of pulses from the EVCO 8 is also sent to a reversible counter 9. The reversible counter 9 may be implemented using logic gates, flip-flops, transistors, and/or other circuit elements. The reversible counter 9 counts up or down depending on the inputs $V_{o\_up}$ and $V_{o\_down}$. The value of the reversible counter 9, $\theta_{CNT}$, is fed to the optical modulator 14 for modulating the reference optical signal $S_{ref}$, as discussed with reference to FIG. 4. The relation between the phase $\theta_o$ and $\theta_{CNT}$ can be expressed as follows:

$$\theta_o = 2\pi(\theta_{CNT}/N) \quad (9)$$

In equation (9), the number N is the interpolation factor and is also the dividing factor of the divider 17 in FIG. 4.

Effectively, the PD 13, LF 7, EVCO 8, reversible counter 9, and optical modulator 14 form a phase-locked loop, through which the phase error $\varphi_E$ between the encoded signals $S_{AEi}$ and $S_{BEi}$ and the modulated reference signals $S_{AEr}$ and $S_{BEr}$ is minimized. Since the PLL includes both optical components and electrical components in the loop, it is a quasi-optical PLL (QOPLL). When the QOPLL reaches a stable operation state, the phases in the optical signals $S_{Ar}$ and $S_{Br}$ tracks (or locks onto) the phases of the optical signals $S_{Ai}$ and $S_{Bi}$. The same is true for their electrical counterparts, i.e., the phases in the electrical signals $S_{AEr}$ and $S_{BEr}$ tracks (or locks onto) the phases of the electrical signals $S_{AEi}$ and $S_{BEi}$. Embodiments of the optical encoder 100 may provide for excellent noise rejection capability and can be used in various applications such as controllers for high-precision servomechanisms and machines with high-speed numerically controlled movement.

Figure 7:
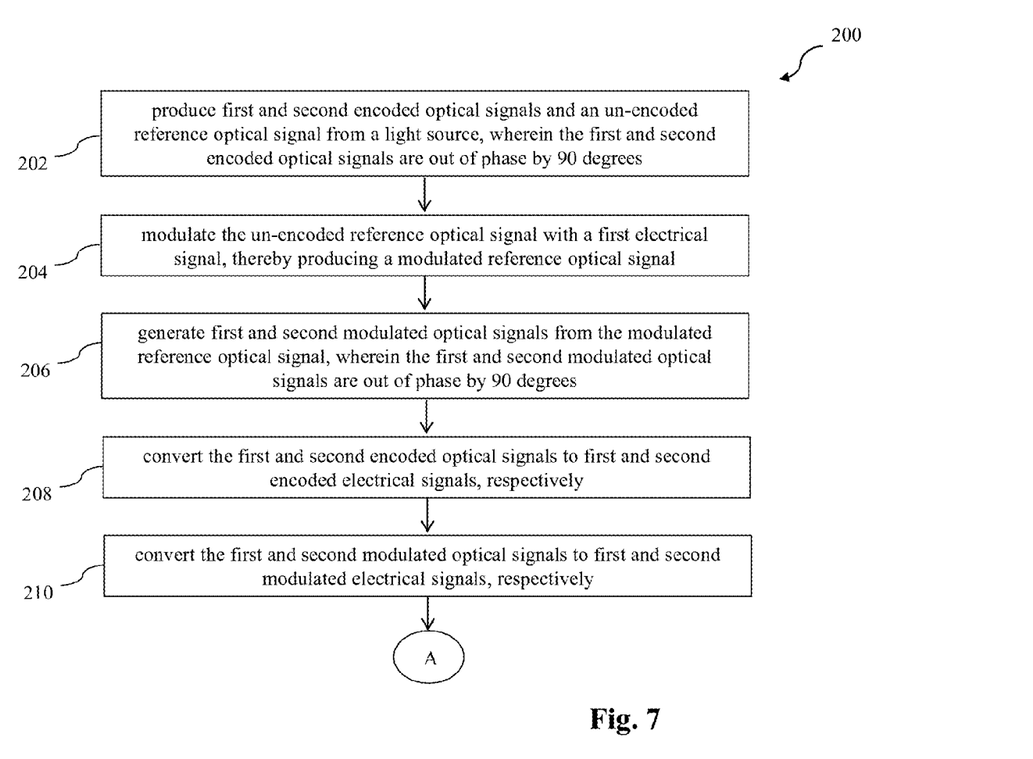
FIGS. 7 and 8 show a flow chart of a method of performing optical encoding, according to aspects of the present disclosure.
Figure 8:
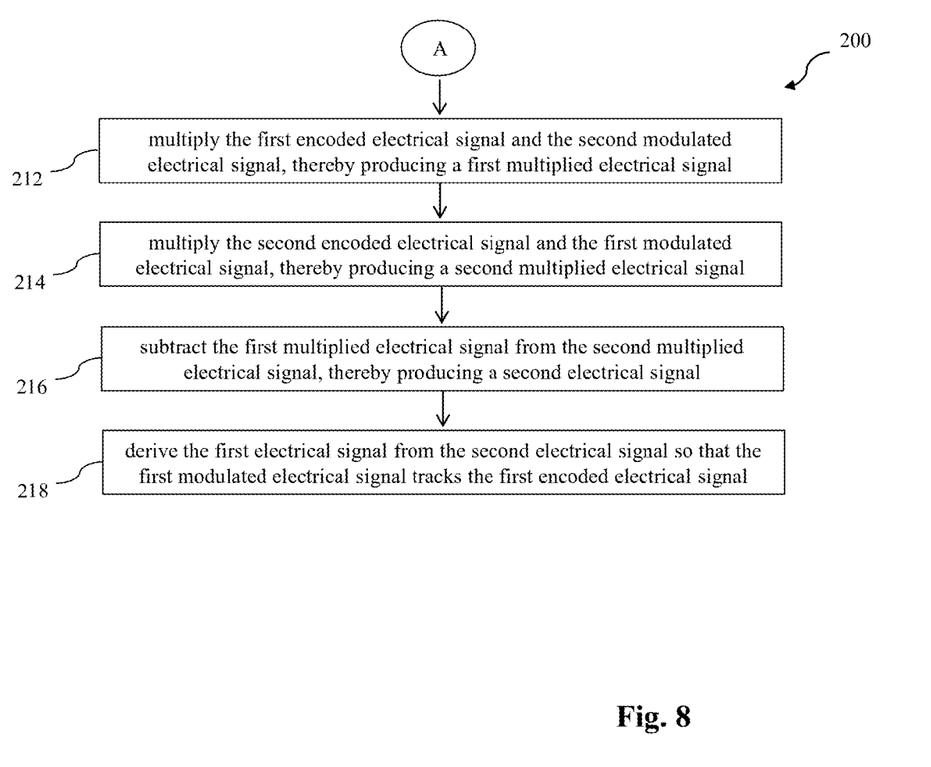
Figure 9:
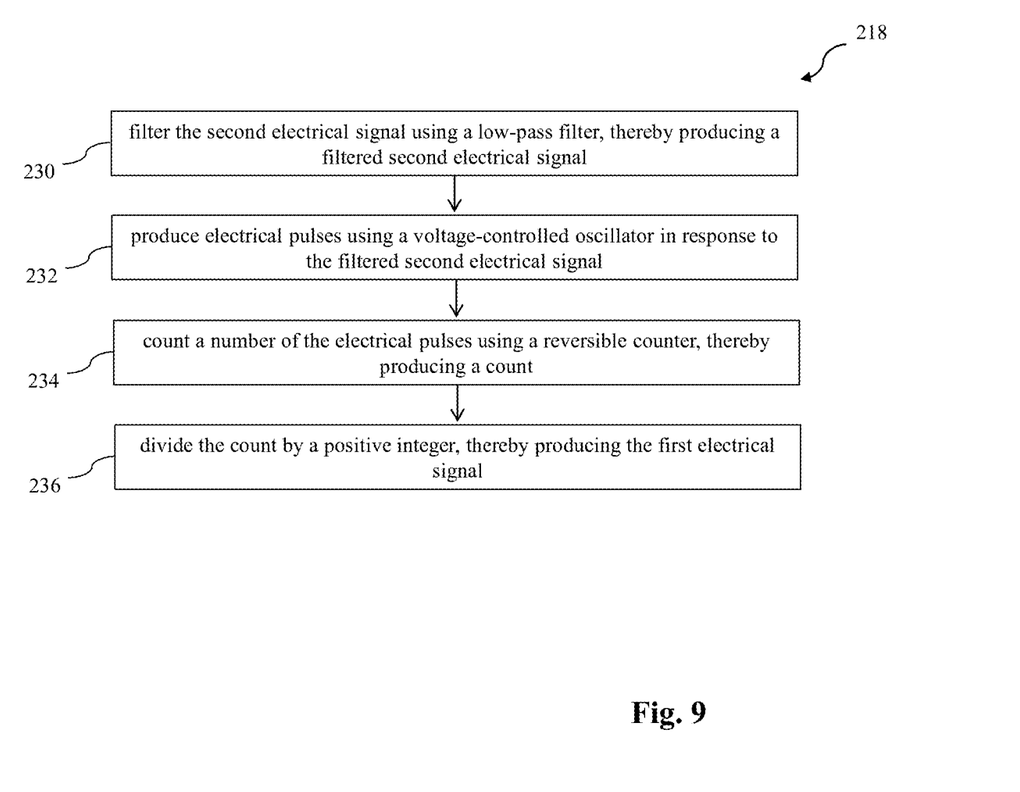
FIG. 9 shows a flow chart of a method of deriving an electrical signal for an operation of the method in FIGS. 7-8, in accordance with an embodiment.

Referring to FIGS. 7-9, shown therein is a method 200 for performing optical encoding according to aspects of the present disclosure. The method 200 may be implemented, in whole or in part, by or with the optical encoder 100. It is understood that additional operations can be provided before, during, and after the method 200, and some operations described can be replaced, eliminated, or moved around for additional embodiments of the method. The method 200 is merely an example, and is not intended to limit the present disclosure beyond what is explicitly recited in the claims. The method 200 is discussed below, in conjunction with FIGS. 1-6 when needed.

At operation 202, the method 200 (FIG. 7) produces first and second encoded optical signals and an un-encoded reference optical signal from a light source, wherein the first and second encoded optical signals are out of phase by 90 degrees. Using the optical encoder 100 (FIG. 1) as an example, the method 200 uses the light source 11 and the track Tr1 of the coding apparatus 16 to produce the first and second encoded optical signals $S_{Ai}$ and $S_{Bi}$. To further the example, the method 200 uses the light source 11 and the track Tr2 of the coding apparatus 16 to produce the reference optical signal $S_{ref}$.

At operation 204, the method 200 (FIG. 7) modulates the un-encoded reference optical signal with an first electrical signal, thereby producing a modulated reference optical signal. Using the optical modulator 14 (FIG. 4) as an example, the method 200 uses the digitally-controlled optical modulation modulator 10 to modulate the reference optical signal $S_{ref}$ with the electrical signal $\theta_{CNT}$ or a derivative of $\theta_{CNT}$. For example, the derivative of $\theta_{CNT}$ may be a divided-by-N version of $\theta_{CNT}$ where N is an integer greater than 1.

At operation 206, the method 200 (FIG. 7) generates first and second modulated optical signals from the modulated reference optical signal, wherein the first and second modulated optical signals are out of phase by 90 degrees. Still using the optical modulator 14 (FIG. 4) as an example, the method 200 uses the 1×2 optical coupler/splitter 12 to generate the first and second modulated optical signals $S_{Ar}$ and $S_{Br}$, which are out of phase by 90 degrees.

At operation 208, the method 200 (FIG. 7) converts the first and second encoded optical signals to first and second encoded electrical signals, respectively. At operation 210, the method 200 (FIG. 7) converts the first and second modulated optical signals to first and second modulated electrical signals, respectively. Using the phase detector 13 (FIG. 6) as an example, the method 200 uses four photo detectors $PDA_i$, $PDB_i$, $PDA_r$, and $PDB_r$ to convert the optical signals $S_{Ai}$, $S_{Bi}$, $S_{Ar}$, and $S_{Br}$ into the electrical signals $S_{AEi}$, $S_{BEi}$, $S_{AEr}$, and $S_{BEr}$, respectively.

At operation 212, the method 200 (FIG. 8) multiplies the first encoded electrical signal and the second modulated electrical signal, thereby producing a first multiplied electrical signal. At operation 214, the method 200 (FIG. 8) multiplies the second encoded electrical signal and the first modulated electrical signal, thereby producing a second multiplied electrical signal. Still using the phase detector 13 (FIG. 6) as an example, the method 200 uses the multiplier 5A to multiply the signals $S_{AEi}$ and $S_{BEr}$ to produce the multiplied signal $S_A$, and uses the multiplier 5B to multiply the signals $S_{BEi}$ and $S_{AEr}$ to produce the multiplied signal $S_B$.

At operation 216, the method 200 (FIG. 8) subtracts the first multiplied electrical signal from the second multiplied electrical signal, thereby producing a second electrical signal. Still using the phase detector 13 (FIG. 6) as an example, the method 200 uses the subtractor 6 to subtract the signal $S_A$ from the signal $S_B$, producing the electrical signal $V_{pe}$, which carries the phase error between the encoded and the modulated signals.

At operation 218, the method 200 (FIG. 8) derives the first electrical signal from the second electrical signal so that the first modulated electrical signal tracks the first encoded electrical signal. Using the optical encoder 100 (FIG. 1) as an example, the method 200 derives the signal $\theta_{CNT}$ from the signal $V_{pe}$ so that the modulated signals $S_{AEr}$ and $S_{BEr}$ track the encoded signals $S_{AEi}$ and $S_{BEi}$. FIG. 9 illustrates the operation 218 in accordance with an embodiment, which includes four sub-operations 230, 232, 234, and 236.

Referring to FIG. 9, at the sub-operation 230, the method 200 filters the second electrical signal using a low-pass filter such as the LP 7 (FIG. 1), thereby producing a filtered second electrical signal. The LP 7 filters out high frequency components of the second electrical signal and allows low frequency components thereof to pass. At the sub-operation 232, the method 200 produces electrical pulses using a voltage-controlled oscillator such as the EVCO 8 in response to the filtered second electrical signal. At the sub-operation 234, the method 200 counts a number of the electrical pulses using a reversible counter such as the reversible counter 9, thereby producing a count. At the sub-operation 236, the method 200 divides the count by a positive integer, thereby producing the first electrical signal.

Although not intended to be limiting, one or more embodiments of the present disclosure provide many benefits to an optical encoder or an interpolator. For example, embodiments of the present disclosure provide a novel quasi-optical (or quasi-electrical) PLL (QOPLL). Various embodiments provide high frequency response and noise rejection, and improve the interpolation factor of the interpolator. Interpolators according to embodiments of the present disclosure may in some applications provide more than twice the interpolation factor than conventional interpolators. Further, some embodiments do not use as much chip or board area as the ROMs and look-up tables in existing electrical interpolators. Therefore, such embodiments may be manufactured more economically than conventional counterparts. This can lead to compact and cost-effective optical encoders with high resolution.

In one exemplary aspect, the present disclosure is directed to a device. The device includes an optical modulator configured to produce first and second modulated optical signals in response to a first electrical signal and a reference optical signal. The device further includes a phase detector configured to receive first and second encoded optical signals and the first and second modulated optical signals and to produce a second electrical signal indicating a phase difference between the first encoded optical signals and the first modulated optical signals. The device further includes a loop filter configured to pass low frequency components of the second electrical signal, thereby producing a filtered second electrical signal. The device further includes a voltage-controlled oscillator configured to produce electrical pulses in response to the filtered second electrical signal. The device further includes a counter configured to count a number of the electrical pulses from the voltage controlled oscillator, thereby producing a count, wherein the first electrical signal to the optical modulator is comprises the count or a derivative of the count.

In another exemplary aspect, the present disclosure is directed to a device. The device includes first means for producing first and second modulated optical signals in response to a first electrical signal and a reference optical signal. The device further includes second means for producing a second electrical signal in response to first and second encoded optical signals and the first and second modulated optical signals, the second electrical signal indicating a phase difference between the first and second encoded optical signals and the first and second modulated optical signals. The device further includes third means for passing low frequency components of the second electrical signal to become a filtered second electrical signal. The device further includes fourth means for producing electrical pulses in response to the filtered second electrical signal and fifth means for producing a count of the electrical pulses, wherein the first electrical signal to the optical modulator is comprises the count divided by a positive integer.

In yet another exemplary aspect, the present disclosure is directed to a method of optical encoding. The method includes producing first and second encoded optical signals and an un-encoded reference optical signal from a light source, wherein the first and second encoded optical signals are out of phase by 90 degrees. The method further includes modulating the un-encoded reference optical signal with a first electrical signal, thereby producing a modulated reference optical signal. The method further includes generating first and second modulated optical signals from the modulated reference optical signal, wherein the first and second modulated optical signals are out of phase by 90 degrees. The method further includes converting the first and second encoded optical signals to first and second encoded electrical signals, respectively. The method further includes converting the first and second modulated optical signals to first and second modulated electrical signals, respectively. The method further includes multiplying the first encoded electrical signal and the second modulated electrical signal, thereby producing a first multiplied electrical signal. The method further includes multiplying the second encoded electrical signal and the first modulated electrical signal, thereby producing a second multiplied electrical signal. The method further includes subtracting the first multiplied electrical signal from the second multiplied electrical signal, thereby producing a second electrical signal and deriving the first electrical signal from the second electrical signal so that the first modulated electrical signal tracks the first encoded electrical signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
   an optical modulator configured to produce first and second modulated optical signals in response to a first electrical signal and a reference optical signal;
   a phase detector configured to receive first and second encoded optical signals and the first and second modulated optical signals and to produce a second electrical signal indicating a phase difference between the first and second encoded optical signals and the first and second modulated optical signals;
   a voltage-controlled oscillator configured to produce electrical pulses in response to the second electrical signal; and
   a counter configured to count a number of the electrical pulses from the voltage controlled oscillator, thereby producing a count, wherein the first electrical signal to the optical modulator comprises the count or a derivative of the count.

2. The device of claim 1, wherein the phase detector includes:
   first and third photo detectors configured to convert the first and second encoded optical signals to first and second encoded electrical signals, respectively;
   second and fourth photodetectors configured to convert the first and second modulated optical signals to first and second modulated electrical signals, respectively;

a first multiplier configured to multiply the first encoded electrical signal and the second modulated electrical signal and to produce a first multiplied electrical signal;

a second multiplier configured to multiply the second encoded electrical signal and the first modulated electrical signal and to produce a second multiplied electrical signal; and a device configured to subtract the first multiplied electrical signal from the second multiplied electrical signal, thereby producing the second electrical signal.

3. The device of claim 1, further comprising:

a loop filter coupled with the phase detector and configured to pass low frequency components of the second electrical signal before the second electrical signal is received by the voltage controlled oscillator.

4. The device of claim 1, wherein the voltage-controlled oscillator comprises a voltage-frequency converter.

5. The device of claim 1, wherein the first electrical signal to the optical modulator is derived from the count by dividing the count an integer greater than 2.

6. The device of claim 1, wherein the first and second modulated optical signals are 90 degrees out of phase, and the first and second encoded optical signals are 90 degrees out of phase.

7. The device of claim 1, wherein the optical modulator includes:

a digitally-controlled light intensity modulator that is configured to produce a third modulated optical signal in response to the first electrical signal and the reference optical input; and an optical coupler or an optical splitter that is configured to produce the first and second modulated optical signals in response to the third modulated optical signal.

8. The device of claim 1, further comprising:

a light source for directing a first light beam at a first track to produce the first and second encoded optical signals and for directing a second light beam at a second track to produce the reference optical signal to the optical modulator.

9. The device of claim 8, wherein the first light beam is directed through the first track to produce the first and second encoded optical signals, and the second light beam is directed through the second track to produce the reference optical input to the optical modulator.

10. The device of claim 8, wherein the first light beam is reflected from the first track to produce the first and second encoded optical signals, and the second light beam is reflected from the second track to produce the reference optical input to the optical modulator.

11. A device, comprising:

means for producing first and second modulated optical signals in response to a first electrical signal and a reference optical signal;

means for producing a second electrical signal in response to first and second encoded optical signals and the first and second modulated optical signals, the second electrical signal indicating a phase difference between the first and second encoded optical signals and the first and second modulated optical signals;

means for producing electrical pulses in response to the second electrical signal; and means for producing a count of the electrical pulses, wherein the first electrical signal comprises the count divided by a positive integer.

12. The device of claim 11, further comprising:

means for directing a first light beam at a first track to produce the first and second encoded optical signals and directing a second light beam at a second track to produce the reference optical signal to the first means, wherein the first and second tracks are on a same coding apparatus.

13. The device of claim 12, wherein the first track includes alternative light transmissive and opaque regions, and the second track is free from light opaque regions.

14. The device of claim 12, wherein the first track includes alternative light reflective and absorptive regions, and the second track is free from light absorptive regions.

15. The device of claim 11, wherein the means for producing first and second modulated optical signals includes a voltage-controlled optical modulator and an optical splitter coupled to an output of the voltage-controlled optical modulator.

16. The device of claim 11, wherein the second means includes:

first and third photo detecting means for producing first and second encoded electrical signals in response to the first and second encoded optical signals, respectively;

second and fourth photo detecting means for producing first and second modulated electrical signals in response to the first and second modulated optical signals, respectively;

means for multiplying the first encoded electrical signal and the second modulated electrical signal, thereby producing a first multiplied electrical signal;

means for multiplying the second encoded electrical signal and the first modulated electrical signal, thereby producing a second multiplied electrical signal; and means for subtracting the first multiplied electrical signal from the second multiplied electrical signal, thereby producing the second electrical signal.

17. A method, comprising:

producing first and second encoded optical signals and an un-encoded reference optical signal from a light source, wherein the first and second encoded optical signals are out of phase by 90 degrees;

modulating the un-encoded reference optical signal with a first electrical signal, thereby producing a modulated reference optical signal;

generating first and second modulated optical signals from the modulated reference optical signal, wherein the first and second modulated optical signals are out of phase by 90 degrees;

converting the first and second encoded optical signals to first and second encoded electrical signals, respectively;

converting the first and second modulated optical signals to first and second modulated electrical signals, respectively;

multiplying the first encoded electrical signal and the second modulated electrical signal, thereby producing a first multiplied electrical signal;

multiplying the second encoded electrical signal and the first modulated electrical signal, thereby producing a second multiplied electrical signal;

subtracting the first multiplied electrical signal from the second multiplied electrical signal, thereby producing a second electrical signal; and deriving the first electrical signal from the second electrical signal so that the first modulated electrical signal tracks the first encoded electrical signal.

18. The method of claim 17, wherein the deriving of the first electrical signal from the second electrical signal includes:

filtering the second electrical signal using a low-pass filter, thereby producing a filtered second electrical signal;

producing electrical pulses using a voltage-controlled oscillator in response to the filtered second electrical signal;

counting a number of the electrical pulses using a reversible counter, thereby producing a count; and dividing the count by a positive integer, resulting in the first electrical signal.

19. The method of claim 17, wherein the producing of the first and second encoded optical signals and the un-encoded reference optical signal from the light source includes:

directing a first light beam at a first track on an apparatus that is a code wheel or a code strip, wherein the first track includes alternative light transmissive and opaque regions; and directing a second light beam at a second track on the apparatus, wherein the second track has only light transmissive regions.

20. The method of claim 17, wherein the producing of the first and second encoded optical signals and the un-encoded reference optical signal from the light source includes:

directing a first light beam at a first track on an apparatus that is a code wheel or a code strip, wherein the first track includes alternative light reflective and absorptive regions; and directing a second light beam at a second track on the apparatus, wherein the second track has only light reflective regions.

* * * * *